Nov. 11, 1952 J. L. STABLEFORD 2,617,328
REAR PROJECTION SCREEN UNIT FOR PICTURE PROJECTIONS
Filed Dec. 20, 1950 5 Sheets-Sheet 1
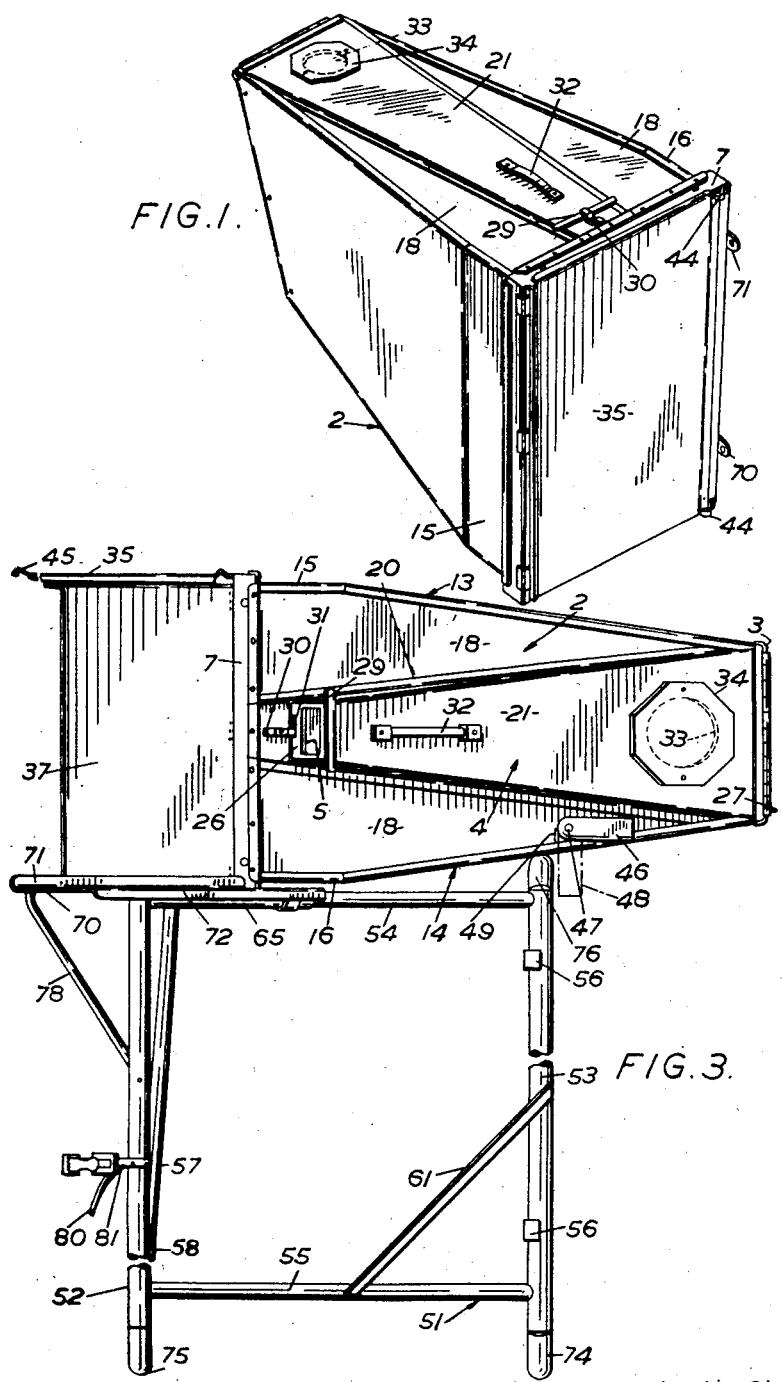
Inventor
John Leslie Stableford
By Richardson, Davis and Nordon
his Attorneys

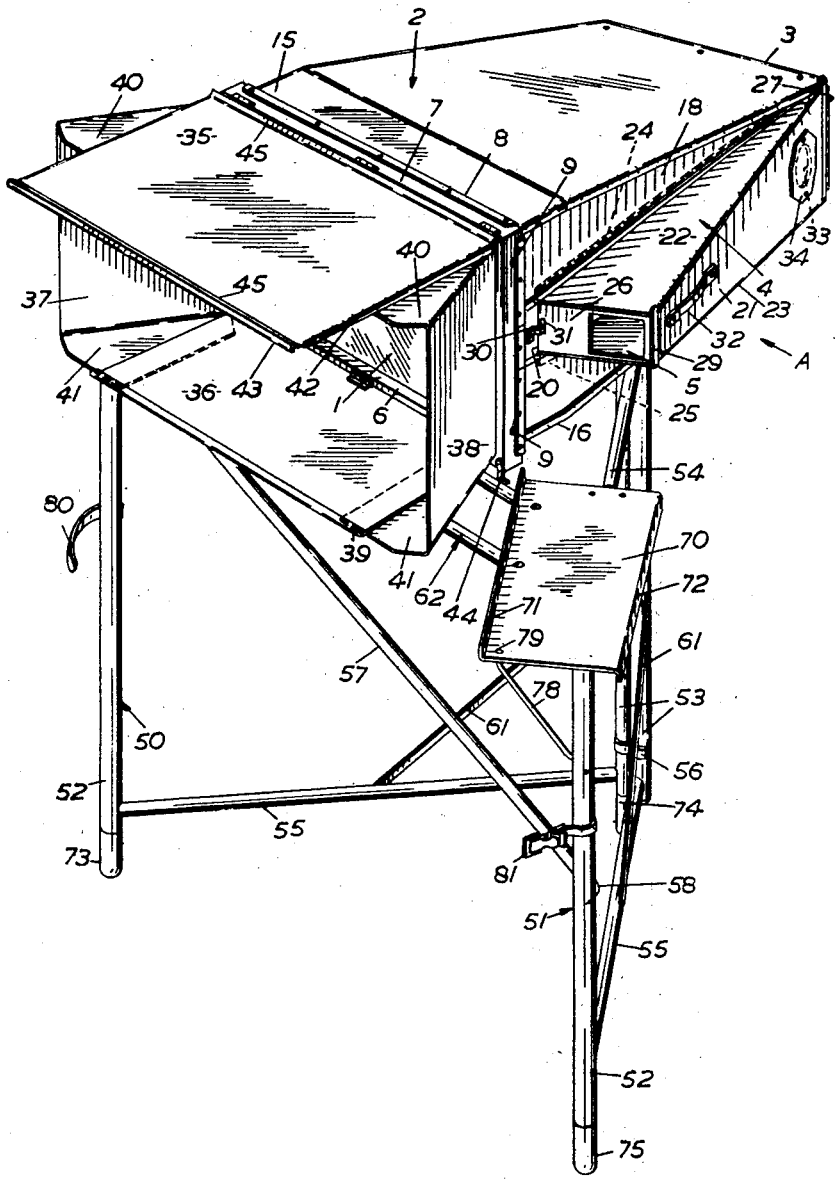

Nov. 11, 1952 — J. L. STABLEFORD — 2,617,328
REAR PROJECTION SCREEN UNIT FOR PICTURE PROJECTIONS
Filed Dec. 20, 1950 — 5 Sheets-Sheet 3

Inventor
John Leslie Stableford
By Richardson, David and Nordon
his Attorneys

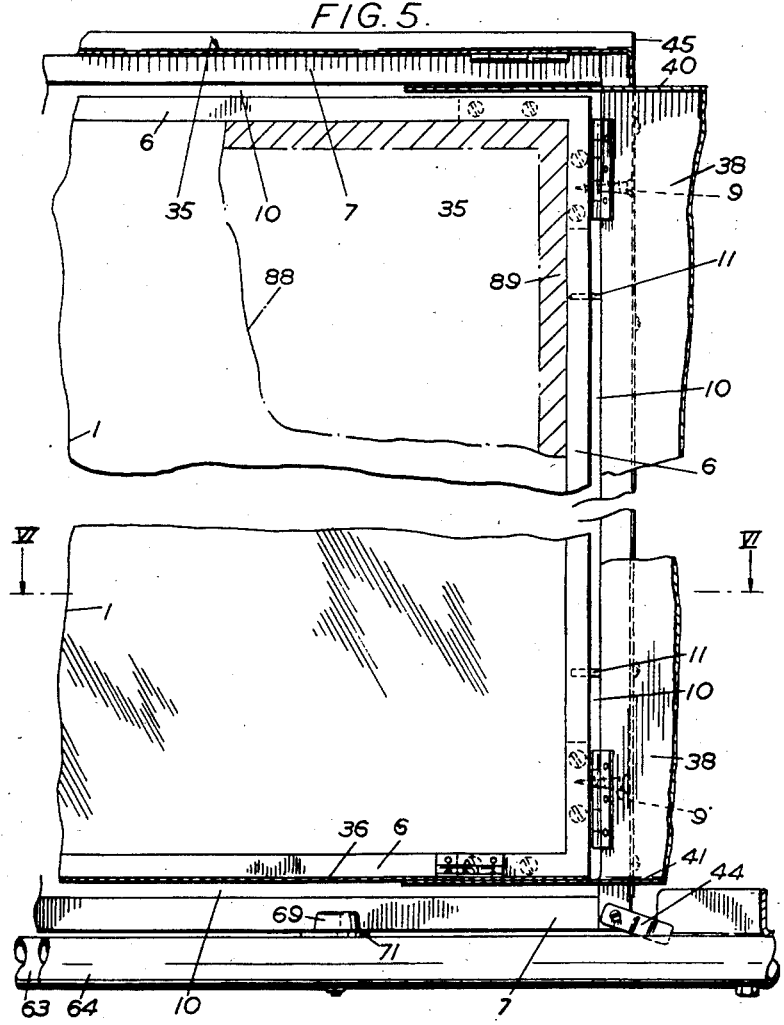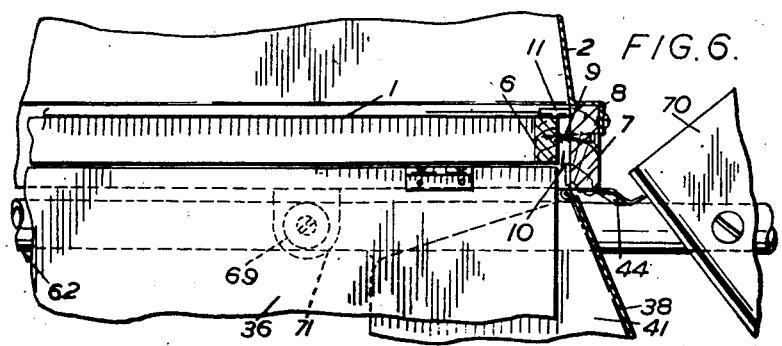
Inventor
John Leslie Stableford
By
Attorneys

Nov. 11, 1952    J. L. STABLEFORD    2,617,328
REAR PROJECTION SCREEN UNIT FOR PICTURE PROJECTIONS
Filed Dec. 20, 1950    5 Sheets—Sheet 5

Inventor
John Leslie Stableford
By
Richardson, David al Norden
his Attorneys.

Patented Nov. 11, 1952

2,617,328

UNITED STATES PATENT OFFICE 2,617,328

REAR PROJECTION SCREEN UNIT FOR PICTURE PROJECTIONS

John Leslie Stableford, London, England

Application December 20, 1950, Serial No. 201,754
In Great Britain December 21, 1949

21 Claims. (Cl. 88—24)

This invention concerns a new or improved rear projection screen unit for use in picture projection, and especially relates to a portable rear projection screen unit for use with motion picture projections, film strip, slide or the like projectors, and is particularly intended for use in daylight by lecturers and others in schools, halls and so forth where space is restricted.

According to this invention there is provided a rear projection screen unit comprising a translucent screen; means for perimetrically hooding the said screen at the front thereof; at least one reflector located at the rear of the said screen and spaced therefrom, and shrouding means for excluding extraneous light from the projection space between the screen and the reflector or reflectors, said shrouding means having, adjacent to one edge of the said screen, an aperture to permit a beam of light to be projected therethrough and on to the, or one of the, said reflectors for reflection on to the rear surface of the screen.

The rear projection screen unit according to the invention is intended for use with a projector, such as a motion picture projector, film strip, slide or the like projector, such projector being so disposed or adapted for such disposal that the beam of light from the projector is thrown through the said aperture in the said shrouding or chamber, reflected from the said reflector or reflectors and is received on the rear of the screen so that the enlarged images formed on the screen may be viewed from the front of the latter, the images being brought into focus by suitable adjustment of the lens of the projector. The images may be centralised on the screen by angular adjustment of the direction of projection of the beam, that is, by angular adjustment of the position of the projector relative to the rear projection screen unit.

As the projector is located at one edge of the said screen so as to project its beam into the projection space or chamber through the said aperture, the said reflector or reflectors is or are arranged obliquely, and in addition may be somewhat offset, with respect to the screen.

The said screen may, for example, be mounted at the front or open end of a rigid projection chamber whilst a single reflector is arranged at the rear or closed end of the chamber. When the unit is particularly intended for use with a film strip or slide projector, in which the projection axis is not very distant from the side of the projector which, when the projector is disposed in its operating position relative to the unit, is adjacent to an edge of the screen, it is found to be satisfactory to provide an aperture in the front of the chamber adjacent an edge of the screen, through which aperture the projected beam from the projector may enter the chamber.

However, when the unit is intended for use with motion picture projectors, which are of greater width than film strip or slide projectors and hence have their projection axes considerably spaced from their sides, the said aperture through which the projected beam enters the projection space or chamber has to be well spaced from the edge of the screen and in order that the bulk of the unit may be reduced during transit or storage, and according to a further feature of this invention, the said aperture is provided at the front end of a trunk arranged along a side of the said shrouding means or projection chamber, said trunk being collapsible or movable partially or wholly into the projection space or chamber, e. g. through a slot in the side wall thereof, for stowage when the unit is out of use.

Conveniently the said projection chamber is slightly convergent from the front end thereof and its rear end supports the or one of the said reflectors (which may be formed of silvered glass or polished metal) in an upright position; where only one reflector is provided, it is so disposed that the normal to the centre of its reflecting surface bisects the angle formed between a line from the centre of the said screen to the centre of the said reflector and a line from the centre of the said aperture to the centre of the said reflector, whereby a projected beam of light passing centrally through said aperture and falling centrally on the said reflector will be reflected centrally on to the rear surface of the screen.

Where the apparatus is furnished with more than one reflector it will have an odd number of reflectors, for example, three, one such reflector being disposed adjacent to the rear end of the projection space or chamber whilst the other two reflectors are disposed adjacent to the opposite sides thereof, the reflecting surfaces of the said reflectors being so disposed that a beam of light projected centrally through the said aperture and falling centrally on to the reflector arranged adjacent to the opposite side of the projection space or chamber is reflected on to the reflector arranged adjacent to the other side of the projection space or chamber, thence on to the reflector adjacent to the rear end of the projection space or chamber, and is finally reflected centrally on to the rear surface of the said screen.

Preferably the said chamber (and the said trunk, when provided) is or are formed from sheet metal, for example, from aluminium or aluminium alloy sheet, and the chamber may be four sided, the sides being connected along their edge portions by angle members.

According to a further feature of the invention, the said means for perimetrically hooding the front of the screen may comprise hinged panels carried by the screen-supporting structure and foldable and extendable with respect thereto. Thus the said hooding means may comprise upper and lower panels hingedly connected respectively to upper and lower parts of the screen supporting structure and a pair of side panels hingedly connected respectively to side parts of the said screen supporting structure, all of the said panels being adapted, when the apparatus is to be used, to extend forwardly of the screen, and, when the apparatus is to be stowed, to be folded inwardly over the said screen, thereby to preserve the latter from damage when the apparatus is stowed.

Each of the said side panels may be provided with inwardly extending wings at their upper and lower edges adapted, when the panels are extended from the screen, respectively to support the upper and lower panels in their extended positions.

According to yet another feature of the invention, there is provided, on or in combination with, a rear projection screen unit according to the invention, means for supporting a projector so that the beam of light projected thereby will enter the said projection space or chamber through the said aperture for reflection by the said reflector or reflectors on to the rear of the said screen.

Thus a collapsible stand is provided in combination with the said rear projection screen unit, said collapsible stand being adapted to locate and support the rear projection screen unit and a projector in mutually appropriate positions for the latter to project a beam into the said projection space or chamber through the said aperture for reflection by the said reflector or reflectors on to the rear of the said screen.

Conveniently, in one arrangement, the said collapsible stand may comprise a pair of upright frames hingedly interconnected at one end and adapted, when being collapsed, to be folded together in side-by-side relationship, and, when required for use, to be drawn apart at their free ends, cross-bracing means being provided for retaining the said frames in their opened condition.

Although the aforesaid perimetrical hooding serves effectively to prevent extraneous light reaching the front surface of the said screen when the unit is used in a lighted room, it has been found that where the room in which the apparatus is to be used is illuminated by light sources such as windows, and in particular, by skylights in front of the said screen, the extraneous light from these sources which impinges on the screen reduces the contrast of the images projected thereon, since such light, by dispersion upon the surface of the screen, reduces the depths of the shadows of the image whilst the overall reflection of such extraneous light by the screen produces glare and reduces the definition of the image.

Thus according to a further feature of this invention, a transparent filter is located adjacent the front surface of the screen, said filter serving to eliminate or reduce the reflection of extraneous light from the front surface of the said screen. When this filter is used it is preferred also to use the perimetrical hooding although the latter could be omitted in this case if desired.

The said filter may be in the form of a sheet of transparent material, e. g. cellulose acetate or the like, such material being coloured by dyeing or the like, it being found that a neutral coloured filter, i. e. a filter which absorbs all wave lengths in the visible spectrum substantially to the same extent when light is transmitted therethrough, for example a neutral grey, stone or straw coloured filter gives most advantageous results. Conveniently, the said filter is mounted in an auxiliary frame adapted to fit into, or be secured to the frame surrounding the screen.

In order that the invention may be more thoroughly understood some embodiments of the same will now be described with reference to the accompanying drawings, in which:

Fig. 1 is a perspective view of one form of rear projection screen unit constructed in accordance with this invention, the unit being shown in its stowed or collapsed condition;

Fig. 2 is a perspective view illustrating the unit shown in Fig. 1 mounted upon a stand ready for use;

Fig. 3 is a side elevation of the apparatus shown in Fig. 2 looking in the direction of arrow A on that figure;

Fig. 5 is an enlarged part-sectional fragmentary view of the front of the apparatus;

Fig. 6 is a section on line VI—VI Fig. 5;

Figure 4:
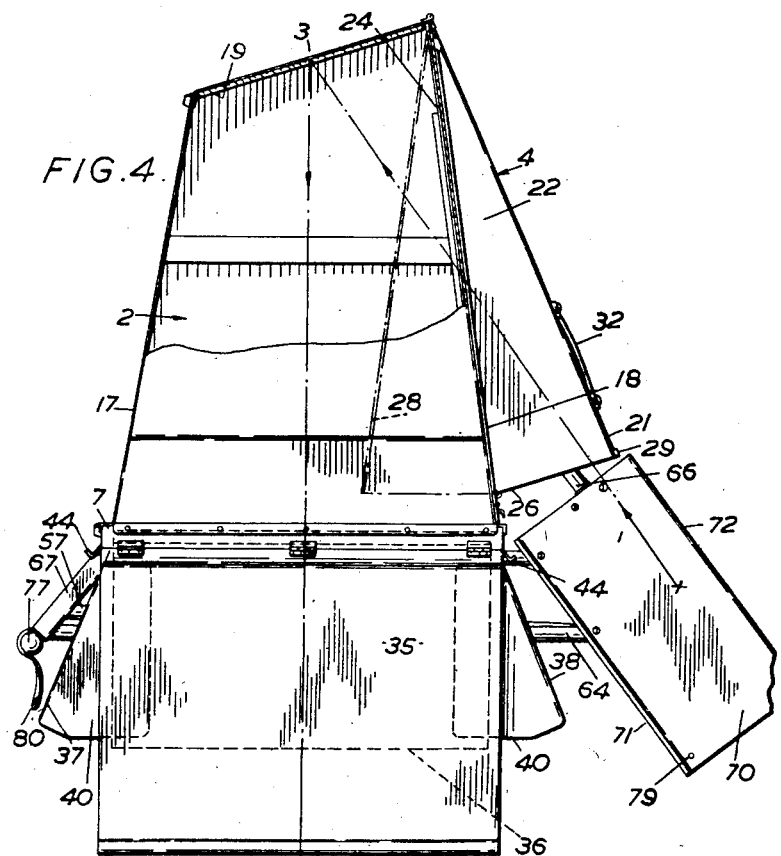
Fig. 4 is a plan of the apparatus shown in Figs. 2 and 3.

Referring to Figs. 1 to 7 of the drawings, it will be seen that the rear projection screen unit comprises a translucent screen 1 carried at the front end of a rigid projection chamber 2 having a closed rear end 3 and provided along one side with a trunk 4 having an aperture 5 at its front and adjacent one side edge of the screen 1. The chamber 2 is of oblong cross sectional form and converges on all sides towards its rear end.

The screen 1 may be formed of frosted glass but is preferably formed of a frosted translucent plastic sheet. The plastic used is preferably cellulose acetate, frosted on both its surfaces. The screen 1, as will be seen from the drawings, is of rectangular form and is perimetrically secured to a rectangular frame, hereinafter referred to as the "screen frame" 6. Where the screen is formed of a sheet of plastic material, e. g. cellulose acetate, which is hygroscopic and consequently expands and contracts superficially in accordance with variations in the relative humidity of the surrounding atmosphere, the screen frame 6 is preferably formed of wood and is thus resilient, permitting superficial expansion and contraction of the screen without buckling or bursting thereof.

Conveniently the screen frame 6 is made of strips of wood of about ¾" x ⅜" cross section and the upper and lower edges of the screen are attached to the upper and lower rails of the screen frame which are slightly inwardly bowed so that they tend to resume a straight form and thereby maintain the screen taut in a vertical direction. The side rails of the screen frame 6 are also slightly bowed inwardly initially and thus maintain the screen taut in a horizontal direction.

The screen frame 6 is carried within a rectangular main frame 7 which also is preferably formed of wood, but which is, in this case, quite rigid and which is carried rigidly in the front end of the chamber 2 which is furnished with flanges 8 for receiving the main frame 7. The screen frame 6 is supported in the main frame 7 at each of its ends by means of a pair of screws 9, the extent to which these screws are tightened determining the tautening stress applied to the screen via the screen frame 6.

It will thus be seen that the screen frame 6 "floats" within the main frame 7 and is separated therefrom by a perimetrical gap 10. However, the screen frame 6 is located positively in its correct position in the main frame 7 by means of stops 11 which engage with the rear surfaces of the side rails of the screen frame 6 (see Figures 5 and 6).

It will be appreciated that the mounting of the screen frame 6 in the main frame 7 as above described permits the ready removal of the screen frame from the latter, and its replacement therein, should it be desired to clean the screen, or to replace an accidentally damaged screen.

The projection chamber 2 is conveniently formed of sheet aluminium or aluminium alloy, but it could, if desired, be formed of any other suitable material of sufficient rigidity, for example, fibre board or thermoset plastic laminates.

As will clearly be seen from Figure 3, the top 13 and bottom 14 of the chamber 2 respectively have portions 15 and 16 extending rearwardly from the upper and lower rails of the main frame 7 at right angles to the plane of the main frame 7, the top and bottom of the chamber then converging uniformly to the rear end 3 of the chamber. The sides 17 and 18 of the chamber 2 converge uniformly from the main frame 7 to the rear end 3 of the chamber. (See Figure 4.)

The rear end 3 of the projection chamber 2 is vertical, but is disposed obliquely to the main frame 7 making an angle of approximately 30° and carries on its inner surface a plane mirror or reflector 19.

The vertical side 18 of the chamber 2 is furnished with a wedge shaped longitudinal slot 20 (as is clearly seen from Figs. 2 and 3) having its narrower end at the front of the chamber. In this slot is mounted the aforesaid trunk 4 which is of U-shape in cross section comprising a vertical wall 21 of wedge shape and corresponding in form to the slot 20 in the side 18 of the chamber 2 and upper and lower flanges 22 and 23 which extend inwardly at right angles to the wall 21 and which are each of substantially right angled triangular form in plan (as is clearly seen from Figs. 2 and 4), each of these flanges being provided at its inner edge respectively with an upturned end downturned flanges 24 and 25. At its front end the trunk 4 is furnished with a vertical wall 26 furnished with the aforesaid aperture 5, which is conveniently of rectangular form.

At its rear end the trunk is hingedly connected to the adjacent edge of the rear wall 3 of the chamber 2 by a long vertical hinge 27, so that the trunk can be pivoted about this hinge either to move it into the chamber 2 so that its vertical wall 21 is flush with the vertical wall 18 of the chamber, as shown in dot and dash lines at 28, Figure 4, or pulled out into the position shown in full lines in that figure, the outward movement of the trunk being limited by the engagement of the flanges 24 and 25 with the inner surface of the wall 18 adjacent the upper and lower edges respectively of the said wedge shaped slot 20. A stop bar 29 is provided on the front outer end of the trunk 4 and projects above and below the latter so as to limit the inward movement of the trunk.

A trunk buckle 30 is provided at the front end of the chamber 2 and is engageable in a slot 31 in the front wall 26 of the trunk 4 to lock the latter in its extended position, and is also adapted to engage over the stop bar 29 to lock the trunk in its stowed position.

The inside surfaces of the chamber 2 and the trunk 4 are preferably furnished with a matt black finish.

The obliquity of the reflector 19 with respect to the screen 1 is such that when a beam of light is projected through the aperture 5 of the extended trunk 4 so that the axis of such beam impinges centrally on the reflector 19, the beam will be reflected forwardly and symmetrically onto the screen 1. Figure 4 indicates diagrammatically the axis of the beam of projected light from a projector, not shown, placed to one side of the screen, more-or-less level therewith. Thus, a person or persons in front of the screen will be able to observe on the screen enlarged images projected indirectly thereon from the projector at the side of the screen.

The reflector 19 may be secured to the interior surface of the end wall 3 of the chamber 2 in any suitable manner. For example, it may be supported at its corners or elsewhere by metal clips, or it may be resiliently mounted on rubber blocks on the end wall 3 so that minor shocks received by the unit during use or transport thereof will not damage the reflector.

When the unit is stowed, the trunk 4 is located in its inner position and the unit is turned over from the position shown in Fig. 2 on to its side wall 17 and is transported in this position, the side wall 21 of the trunk 4 being furnished with a carrying handle 32, as is clearly seen from Fig. 1.

The trunk 4 may, if desired, be provided, as shown in Figs. 2 and 3, with an inspection aperture 33 covered by a removable plate 34 and through which aperture the reflector 19 can be inspected and cleaned on removing the plate 34 which is secured in position by screws or in any other suitable manner. The said aperture 33 may also be used for viewing the rear surface of the screen to facilitate the focussing of images projected thereon.

The screen 1 is perimetrically hooded on its front side for the purpose of preventing extraneous light shining directly on the front surface of the screen 1, whilst at the same time providing a wide viewing aperture for the screen.

The hood includes top and bottom rectangular flat panels 35 and 36 and two side panels respectively marked 37 and 38 and all these panels are adapted to be folded in superposed relationship over the front of the screen 1 when the apparatus is stowed, the panels thus forming a rigid protection for the screen 1.

The bottom panel 36 is hinged to the lower rail of the screen frame 6, as is clearly seen, for example, from Figs. 2 and 5, and has its free edge beaded at 39. This bottom panel 36 is adapted to be folded upwardly, when being stowed, into a plane parallel to the screen 1 and, when stowed, the ends of the panel 36 engage the vertical rails of the frame 6.

Each of the side panels 37 and 38 is hinged to the corresponding side rail of the main frame 7 and is foldable inwardly after the panel 36 has been turned into a vertical position. The outer edge of each of the side panels 37 and 38 may be furnished with a beaded free edge like the free edge 39 of the panel 36, such beading serving to stiffen the panels.

Each of the side panels 37 and 38 is of rectangular form and is provided at its upper and lower edges with an approximately wedge or truncated triangular shaped wing, these wings being respectively marked 40 and 41.

When the side panels 37 and 38 are stowed, the wings 40 and 41 are adapted to pass through the gaps 10 between the top and bottom rails of the screen frame 6 and the adjacent top and bottom rails of the main frame 7. This will be apparent from Fig. 5.

The top panel 35 of the hood is hinged at its rear edge to the top rail of the main frame 7 and is preferably furnished at each of its opposite ends with a downturned flange 42 and with a beaded front edge 43, the said flanges and bead giving the panel substantial rigidity. The panel 35 may be provided with longitudinal ribs such as 45 to give it additional stiffness.

Thus to stow the hood, the panel 36 is folded upwardly, the end panels are turned inwardly, and then the top panel 35 is folded down over the other stowed panels. The bottom panel 36 is conveniently of a depth from front to rear equal to about two thirds to three quarters of the depth of the main frame 7, the side panels 37 and 38 are conveniently of a width equal to rather less than half the width of the frame 7 from side to side, whilst the top panel 35 is of substantially the same dimensions as the frame 7. Thus, when this top panel is in its stowed position it substantially covers the whole front of the frame 7, the side flanges 42 engaging over the vertical side rails of the main frame 7 as will be apparent from Fig. 1, for example, in which the said main frame side rails are shown in the horizontal position.

To retain the hood in its stowed condition, the main frame 7 is provided with a pair of pivoted clips 44 arranged one at each end of the bottom rail of the frame 7 and adapted to be turned from the position shown, for example, in Fig. 5, upwardly into overlapping relationship with the panel 35 to retain the latter in its stowed condition, as is clearly seen from Fig. 1.

The hood is opened by actions the reverse of those above described and it will be understood that the provision of the wings 40 and 41 on the side panels 37 and 38 enable these panels to be opened through an angle greater than 90° with respect to the screen 1 so that when they are open to their fullest extent, the hood is of oblong funnel shape, divergent from the screen. It will also be understood that when the hood is opened the lower wings 41 of the side panels 37 and 38 support the bottom panel 36 of the hood whilst the upper wings 40 of the side panels 37 and 38 support the upper panel 36 of the hood in a horizontal position.

If desired, stops may be provided to prevent the side panels 37 and 38 being opened too far.

The internal surfaces of the hood panels are preferably furnished with a matt black finish thereby to minimise reflection of light on to the front of the screen.

The above described embodiment is particularly suitable for use with motion picture projectors, since the projection axes of these projectors are usually considerably spaced from the side thereof which is adjacent to the unit, and consequently the aperture 5 has to be considerably spaced from the adjacent edge of the screen; the provision of the said folding trunk 4 enables this spacing to be obtained and yet permits the unit to be stowed in a relatively small space. However, when the unit is particularly intended for use with film strip or slide projectors in which the projection axis is not so spaced from the side of the projector adjacent to the unit, the unit may be modified, the trunk 4, which in this case does not have to extend so far laterally of the chamber 2, being integrally formed with the chamber 2; thus the trunk may be in the form of a longitudinal, rearwardly-tapering, bulge of approximately semicircular cross-sectional shape at its front end, this bulge conveniently being closed at its front end with a wooden panel furnished with an aperture corresponding to the aperture 5 in the trunk 4.

The unit above described may conveniently be used upon a flat table or like horizontal surface and in order to enable the unit to be sustained horizontally on such a table with the underside of the frame 7 resting upon the latter, the rear part of the chamber 2 is externally provided with one or more foldable legs. One such leg marked 46 is shown clearly in Fig. 3 in its stowed position. This leg is pivoted at 47 to the upright side 18 of the chamber 2 and can swing downwardly in a vertical plane into the dot-and-dash position indicated at 48 in Fig. 3, a stop 49 being provided on the chamber 2 to prevent the leg 46 swinging beyond the vertical position. When the unit is to be used on a table in this way, the projector would also be placed on the table at the side of the main frame 7 of the unit so that the lens of the projector would be directed towards the aperture 5 in the front end of the trunk 4 so as to project its light beam horizontally through this aperture and centrally on to the reflector 19. Thus, the adjustments to be performed by an operator are minimised, and accommodate the slightly varying heights of the projection axes of different projectors, height of the upper edge of the aperture 5 is so arranged as to be equal or slightly greater than the highest projection axis likely to be encountered. Thus with projectors having lower projection axes, the only adjustment that will be required will be a suitable raising of the projector.

Preferably, however, a stand is provided in combination with the unit above described for supporting the latter in its horizontal operative position. Thus the unit can be erected in the front of a classroom, lecture room, or the like without the use of existing tables, or disturbing the room in any way.

Figure 7:
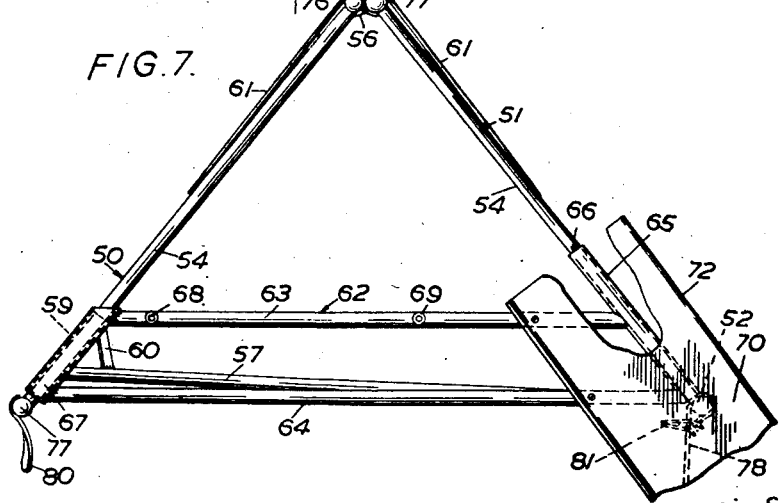
Fig. 7 is a plan of the erected stand shown in Figs. 2 and 3 with the rear projection screen unit removed therefrom.

The stand preferably comprises, as is clearly shown in Figs. 2, 3 and 7, for example, two similar rectangular side frames respectively marked 50 and 51, each comprising a pair of uprights 52 and 53, rigidly secured together by top and bottom cross rails 54 and 55; the uprights 52 and 53 and the cross rails 54 and 55 of the frames 50 and 51 are preferably formed of metal tube, desirably of aluminium or an aluminium alloy tube so as to be light in weight, whilst being rigid in construction.

The two rear uprights 53, 53 of the frames 50 and 51 are hinged together near their upper and lower ends by means of hinges 56 so that the two frames may be folded one on to the other or separated V-fashion as shown in Figures 2 and 7. To secure these in this latter condition, a cross bracing strut 57 is provided and is pivoted at its upper end upon the rail 54 of the frame 50 near the front end of this rail, the strut 57 being adapted at its lower and free end for engagement with a pin 58 rather more than half way down the front upright 52 of the frame 51, so that when engaged with this pin the strut 57 holds the two side frames 50 and 51 apart. The upper end of the strut 57 is conveniently pivoted to the top rail 54 of the side frame 50 by furnishing the strut with a transverse sleeve 59 rotatable upon, but axially immovable with respect to, the top rail 54 and to which sleeve the strut is conveniently braced by a diagonal member 60.

Each of the side frames 50 and 51 are braced across the rear lower corners thereof by stays 61.

A long narrow frame 62 of trapezium shape is provided to extend horizontally across the front of the stand when the latter is erected, this frame comprising a pair of parallel rails 63 and 64 which are conveniently formed of light weight tubular metal and which are welded or otherwise secured at one end to a transverse sleeve 65 which is rotatably mounted on the upper rail 54 of the frame 51 of the stand, and at the front part of said rail, rearward movement of the sleeve 65 on the rail 54 being prevented by a stop pin or rivet 66 (Fig. 7) in the rail 54. The ends of the parallel rails 63 and 64 opposite to those fixed to the sleeve 65, are secured, e. g. by welding, to an inverted channel section member 67 which is adapted to fit over the top rail 54 of the side frame 51 and over the sleeve 59 which carries the strut 57.

When the stand is in its stowed condition, the frame 62 hangs downwardly in a more or less diagonal position adjacent to the side frame 51 of the stand whilst the strut 57 occupies a similar position with respect to the frame 50.

However, when the stand is erected the two side frames are separated, the elongated frame 62 is raised and its inverted channel member 67 is engaged over the sleeve 59 of the cross bracing strut 57 and then the latter is swung forwardly into position and its lower end hooked on to, or engaged with, the pin 58 on the front upright 52 of the side frame 51, the whole stand then being rigidly braced.

The frame 62 constitutes a support for the front part of the rear projection unit and the rear rail of this frame 62 is furnished with a pair of upstanding projections 68 and 69 which may be in the form of rubber domes secured to the rail by screws which are adapted to fit into lugs respectively marked 70' and 71 provided on the bottom rail of the main frame 7 of the projection unit, so as to locate this unit on the stand and prevent rearward or lateral movement of the unit with respect to the stand. It will be noticed that the projections 68 and 69 are nearer one end of the frame 62 than the other end thereof. This arrangement provides for the location of the projection unit to one side of the stand so as to provide on the latter ample room for a horizontal table or platform 72 to support a projector. This table or platform is conveniently in the form of flat metal plate secured rigidly to the frame 62 and its sleeve 65, the platform being adapted to fold downwardly into a substantially vertical plane with the frame 62 when the latter is stowed.

The inner edge of the platform 70 is preferably furnished with an upturned flange 71, whilst its outer edge preferably has a downturned flange 72. The arrangement of the platform 70 on the stand is such that when the projection unit is mounted on the latter, the platform is in alignment with the aperture 5 in the trunk 4 of the projection unit, so that if a projector is placed upon the platform 70, it will be at substantially the correct level and at the correct angle to project its light beam through the aperture 5 on to the reflector 19 of the unit.

If desired, the platform 70 may be provided with means for positively locating a projector thereon so that its correct disposal with respect to the aperture 50 of the projection unit is automatically accomplished when the apparatus is being set up for use. Thus, the projector may be provided with two or more studs on its underside, or upon a plate or the like carried thereby, such studs being adapted to engage holes provided at appropriate places in the platform 70. Alternatively, studs may be provided on the platform 70 and be adapted to engage holes in the base of the projector or in a plate or the like carried thereby. Since most projectors are provided with rubber bushes or the like on their undersides, the first described arrangement will usually be the most convenient to employ, the screws or bolts which customarily retain the said rubber bushes or the like to the base of the projector being elongated to serve as the said studs.

The front and rear uprights of the side frame 50 of the stand are provided with downward extensions 73 and 74 respectively at their lower ends and the front upright 52 of the frame 51 is provided with a similar downward extension 75. These extensions may constitute feet and be formed of wood or any other suitable material, and, if desired, these extensions may be furnished with castors. The extensions may be carried at the ends of tubes coaxially disposed within the front and rear uprights of the frame 50 and the front upright of the frame 51, these tubes being arranged for telescopic movement so that the height of the stand may be adjusted to vary the height of the projection unit. Suitable locking means, for example, pins adapted to pass through transverse holes in the said upright and through transverse holes in the said tubes, may be provided to retain the tubes in an adjusted position.

The rear upright 53 of the frame 50, is provided with an upward extension 76 (see particularly Fig. 3), which serves to engage the underside 14 of the projection unit chamber 2 to support the unit in a horizontal position upon the stand. The front upright of the side frame 50 and the rear upright of the side frame 51 of the stand may, where these are formed by tubes, as previously described, be plugged with a wooden or other suitable plug 77 whilst the top of the front upright of the frame 51 is covered by the table or platform 70.

To give the platform 70 additional support at its inner front corner, a diagonal wire stay 78 may be provided, this being hinged at its lower end at the front upright 52 of the side frame 51 of the stand and adapted at its upper end to engage in a hole 79 in the front inner corner of the platform 70.

Conveniently, two halves 80 and 81 of a buckled strap are respectively affixed to the front uprights of the side frames 50 and 51 to enable the frames to be secured together in a folded condition when not in use.

To use the apparatus above described, the stand is first erected as explained and the rear projection screen unit is placed upon the top of the stand and anchored thereto, also as explained. The trunk 4 of the unit is then extended to its fullest extent and locked in this position by means of the trunk buckle 30 engaging in the slot 31, and the projector is placed on the platform 70 which will in these circumstances lie immediately in front of the forward end of the extended trunk 4. The projector is placed with its lens pointing into the aperture 5 in the front end of the trunk 4 and the orientation of the platform 70 is such that if the projector is placed parallel to one of the longitudinal edges 71 or 72 thereof it will direct its beam substantially centrally on to the reflector 19, only a small degree of adjustment being necessary to make sure that the image is centralised upon the screen. When the apparatus has been set up and projector placed as above described, the hood around the screen 1 is opened, and the apparatus is then ready for use. When the projector commences to operate, its beam is thrown on to the reflector 19 and reflected thence on to the screen 1 where an image is symmetrically displayed.

If desired, a filter may be provided for location in front of the screen 1 when the latter is insufficiently protected, for example, in strong sunlight, from extraneous light which would, by dispersion on the front surface of the screen, reduce the contrast and definition of the image.

Such a filter is conveniently in the form of a transparent sheet of material, such as cellulose acetate, coloured by suitable means to a depth of colour sufficient to eliminate or reduce the aforesaid loss of contrast and definition resulting from the dispersion of extraneous light on the front surface of the screen. Preferably the said filter is carried in a frame adapted to fit into the said screen frame where the latter overlays the screen. Alternatively, however, the filter frame may be adapted to be secured to the said main frame, or to be carried by the panels of the said hood.

Such a filter is illustrated by way of example in Figure 5 in which the filter is indicated by the reference 88, the filter being secured to a resilient wooden frame 89 so that it is maintained taut notwithstanding changes in the relative humidity of the surrounding atmosphere. The filter frame 89 is arranged to be a push fit within the screen frame 6 and is thus readily placed in position in front of the screen 1 when it is desired to use the filter.

It has been found that a filter having a neutral colour e. g. a filter which absorbs all wave lengths of the visible spectrum transmitted therethrough to substantially the same extent such as a neutral filter of grey, stone or straw colour gives the most advantageous effect, and such a filter may even be used with an unhooded rear projection screen unit in full daylight without the images on the screen suffering much reduction in contrast and definition.

Figures 8, 9:
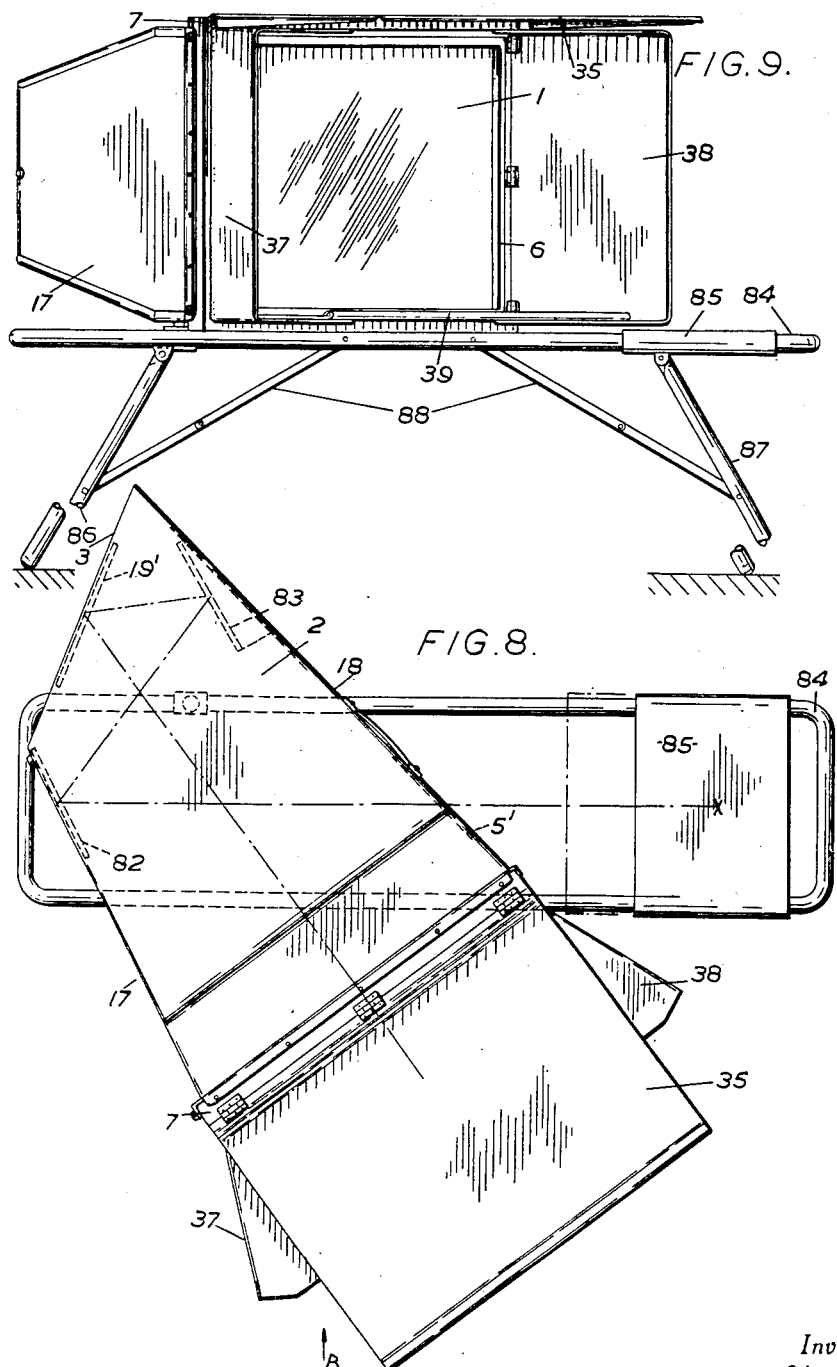
Fig. 8 is a plan of a modified form of apparatus constructed in accordance with this invention.
Fig. 9 is an elevation looking at this modified apparatus in the direction of arrow B Fig. 8.

In the modified arrangement shown in Figs. 8 and 9 of the accompanying drawings, the rear projection screen unit is very similar to that already described, but the trunk 4 is omitted and instead of one reflector 19, the chamber 2 is furnished with three reflectors namely 19' on the rear end wall 3 of the chamber 2, and two further reflectors 82 and 83 respectively, arranged more or less opposite one another, one on the inside of each of the longitudinal side walls 17 and 18 of the chamber 2. The arrangement is such that the projected beam passes into the chamber 2 via an aperture 5' in the longitudinal side wall 18, at the front end thereof, this beam being directed centrally on to the reflector 81 which reflects it on to the reflector 83, from whence the beam passes by reflection to the reflector 19' and thence to the screen 1. This arrangement is particularly suitable for use with projectors having a long focal length lens, since it provides an increased optical path between projector and screen without entailing the use of a larger projection chamber.

Figs. 8 and 9 also show a modified form of stand for supporting the projection unit, this stand comprising a long rectangular frame 84 furnished at one end with a platform 85 which is adjustable longitudinally on the frame 84 and adapted to support the projector, the arrangement being that the frame 84 is adapted to be supported in a horizontal plane by collapsible legs 86 and 87 which may be furnished with retaining stays 88, the projection screen unit being supported on the frame 84 obliquely across the opposite end portion of the latter to that at which the platform 85 is provided. The adjustment of the platform 85 enables the projector to be moved towards and away from the aperture 5' and hence permits projectors with lenses of differing focal lengths to be employed.

What I claim is:

1. A rear projection screen unit comprising a rigid projection chamber; a translucent screen at the front of said chamber; a reflector in said chamber adjacent to the rear end thereof; said projection chamber being furnished with an aperture adjacent to one edge of said screen to permit a beam of light to be projected into said chamber for reflection by said reflector on to the rear of said screen; an upper panel hingedly connected to the front of said projection chamber at the upper part thereof and foldable and extendible with respect to said screen; a lower panel hingedly connected to the lower part of said projection chamber and foldable and extendible with respect to said screen; a pair of side panels hingedly connected respectively to either side of said projection chamber and foldable and extendible with respect to said screen; and inwardly extending wings at the upper and lower edges of each of said side panels for supporting said upper and lower panels respectively in their extended positions, said wings entering said projection chamber through slots adjacent to the upper and lower edges of the screen when said side panels are moved to their folded positions.

2. A rear projection screen unit according to claim 1, including a collapsible stand and means on such stand for supporting and locating the unit thereon, and a platform on such stand for supporting and locating a projector thereon in a position appropriate for the latter to project a beam of light through said aperture for reflection on to the rear surface of said screen, said platform being adjustable with respect to a unit supported by the stand to accommodate different projectors.

3. A rear projection screen unit comprising a rigid projection chamber and a reflector arranged in such chamber adjacent to the rear end thereof; a resilient screen frame, and a translucent screen of frosted plastic material carried thereby, arranged at the front end of said projection chamber and perimetrically spaced from the internal walls of such chamber with spaces at least at its upper and lower edges; a hollow trunk arranged along a side of said projection chamber and extending between the front and rear ends thereof, said trunk being collapsible by movement at least partially into said chamber and furnished with an aperture at its front end; an upper rectangular panel hingedly connected to the front of said chamber at the upper part thereof and foldable and extendible with respect to said screen; a lower rectangular panel hingedly connected to the lower part of said screen frame at the front thereof and foldable and extendible with respect to said screen; a pair of rectangular side panels hingedly connected respectively to the front of said projection chamber at either side thereof and foldable and extendible with respect to said screen; and inwardly extending wings at the upper and lower edges of each of said side panels for supporting the said upper and lower panels respectively in their extended positions, said wings entering said spaces between the upper and lower edges of the screen frame and said projection chamber when said side panels are in their folded positions.

4. A rear projection screen unit according to claim 3, including a collapsible stand and means on such stand for locating and supporting such unit and a projector in mutually appropriate positions for the latter to project a beam of light through said aperture in the projection chamber of the unit for reflection on to the rear surface of the said screen.

5. Apparatus according to claim 4, wherein the said stand comprises a pair of upright frames hingedly interconnected at one end and adapted, when being collapsed, to be folded together in side-by-side relationship, but to be drawn apart at their free ends when required for use; and cross-bracing means for retaining the said frames in their opened condition.

6. Apparatus according to claim 5, including a horizontal stand-bracing and screen unit-supporting member adapted, when the said frames are in their said opened condition, to extend across the upper part of the stand adjacent to the free ends of the said frames, and locating means carried by said stand-bracing and screen unit-supporting member for locating the said screen unit positively upon the stand when in use.

7. Apparatus according to claim 6, including a platform for supporting a projector, said platform being carried by the said stand-bracing and screen unit-supporting member.

8. Apparatus according to claim 7, including locating means carried by the said platform for co-operation with a projector, positively to locate the latter in said appropriate position for use with the said rear projection screen unit.

9. A rear projection screen unit according to claim 4, wherein said hollow trunk is collapsible by movement at least partially into said projection chamber.

10. A rear projection screen unit according to claim 4, wherein said translucent screen comprises a sheet of frosted translucent plastic material, said screen frame resiliently tensioning said screen and serving to maintain the latter taut whilst permitting superficial contraction and expansion thereof.

11. A rear projection screen unit comprising a rigid projection chamber and a reflector arranged in such chamber adjacent to the rear end thereof; a screen frame, and a translucent screen carried thereby, arranged at the front end of said projection chamber and perimetrically spaced from the internal walls of said chamber at least at its upper and lower edges; a hollow trunk arranged along a side of said projection chamber and extending between the front and rear ends thereof and being furnished with an aperture at its front end; an upper rectangular panel hingedly connected to the front of said chamber at the upper part thereof and foldable and extendible with respect to said screen; a lower rectangular panel hingedly connected to the lower part of said screen frame at the front thereof and foldable and extendible with respect to said screen; a pair of rectangular side panels hingedly connected respectively to the front of said projection chamber at either side thereof and foldable and extendible with respect to said screen; and inwardly extending wings at the upper and lower edges of each of said side panels for supporting the said upper and lower panels respectively in their extended positions, said wings entering said spaces between the upper and lower edges of the screen frame and said projection chamber when said side panels are in their folded positions.

12. A rear projection screen unit according to claim 11, wherein said hollow trunk is hingedly connected at its rear end to said projection chamber.

13. A rear projection screen unit comprising a rigid projection chamber and a reflector arranged in said projection chamber adjacent the rear end thereof; a main frame at the front of said projection chamber; a screen frame and a translucent screen carried thereby, said screen frame being arranged within said main frame; a hollow trunk arranged along a side of said projection chamber and extending between the front and rear ends thereof, said trunk being collapsible by movement at least partially into said projection chamber and being furnished with an aperture at the front end thereof; an upper rectangular panel hingedly connected to the upper part of said main frame at the front thereof and foldable and extendible with respect to said screen; a lower rectangular panel hingedly connected to the lower part of said screen frame at the front thereof and foldable and extendible with respect to said screen; a pair of rectangular side panels hingedly connected respectively to side parts of said main frame at the front thereof and foldable and extendible with respect to said screen; and inwardly extending wings at the upper and lower edges of each of said side panels for supporting the upper and lower panels respectively in their extended positions.

14. Apparatus according to claim 13, including a collapsible stand and means on such stand for locating and supporting the rear projection screen unit and a projector, such collapsible stand comprising a pair of upright frames hingedly interconnected at one end; cross bracing means for retaining said frames in an opened condition with their free ends drawn apart; a horizontal stand-bracing and screen unit-supporting member adapted, when the said frames are in their opened condition to extend across the upper part of the stand adjacent to the free ends of the said frames; locating means carried by the said stand-bracing and screen unit-supporting member for locating the said screen unit positively upon the stand; and a platform for supporting a projector, said platform being carried by said stand-bracing and screen unit supporting member in a position appropriate for supporting a projector so that the latter can project a beam of light into said chamber through said aperture for reflection by said reflector on to the rear surface of said screen.

15. A rear projection screen unit comprising a translucent screen; means for perimetrically hooding the said screen at the front thereof; three reflectors located at the rear of the said screen; shrouding means for excluding extraneous light from the projection space between the said screen and said reflectors, said shrouding means having an aperture adjacent to one side edge of the said screen; one of said reflectors being disposed adjacent to the rear end of said shrouding means and the other two reflectors being arranged adjacent to the opposite sides thereof with one of them adjacent the side opposite said aperture, the normal to the centre of the latter reflector bisecting the angle between a line from the centre of said aperture to the centre of the reflector opposite to the aperture and a line joining the centres of the reflectors adjacent to the sides of the shrouding means, the normal to the centre of the reflector adjacent to the side of the shrouding means nearer said aperture bisecting the angle between the lines joining the centre of this latter reflector to the centres of the other two reflectors, and the normal to the centre of the said reflector adjacent the rear end of the said shrouding means bisecting the angle between lines joining the centre of this reflector to the centre of said screen and the centre of the reflector adjacent to the side of the shrouding means nearer the said aperture, whereby a beam of light projected centrally through said aperture will be reflected in turn by each of the said reflectors and then on to the rear surface of the said screen.

16. Apparatus according to claim 15, including a collapsible stand for locating and supporting the said unit and a projector, said collapsible stand comprising a rectangular frame; foldable legs for supporting said frame horizontally; and means on said frame for locating and supporting the said unit and a projector in mutually appropriate positions for the latter to project a beam of light through said aperture for reflection by said reflectors on to the rear surface of the said screen.

17. Apparatus according to claim 16, having a platform on said frame for supporting a projector, said platform being adjustable with respect to said frame towards and away from said means for locating and supporting the said unit, thereby to enable the optical path from the projector to the aperture in said shrouding means of the unit to be adjusted to accommodate different projectors.

18. A rear projection screen unit comprising a rigid projection chamber having an aperture in one of its walls and near the front of such chamber; a screen frame, and a translucent screen carried thereby, arranged at the front of said chamber and perimetrically spaced from the internal walls of said chamber with spaces at least at its upper and lower edges; three reflectors within said chamber, one of said reflectors being disposed adjacent to the rear end of the said chamber and the other two reflectors being disposed adjacent to the wall of the chamber furnished with said aperture and adjacent to the wall of the chamber opposite to said aperture respectively, the normal to the centre of the latter reflector bisecting the angle between lines joining the centre of this reflector to centre of said aperture and to the centre of the reflector adjacent to the aperture-provided wall of said chamber, the normal to the centre of the latter reflector bisecting the angle between lines joining the centre of this reflector to the centres of the other two reflectors, and the normal to the centre of the reflector adjacent to the rear end of said chamber bisecting the angle between lines joining the centre of this reflector to the centre of said screen and to the centre of the reflector adjacent to the aperture-provided wall of the said chamber, whereby a beam of light projected centrally through said aperture will be reflected in turn by each of said reflectors and thence to the rear surface of the screen; and perimetrical hooding for the front of said screen, comprising an upper panel hingedly connected to the front of said chamber at the upper part thereof and foldable and extendible with respect to said screen; a lower panel hingedly connected to the lower part of said screen frame at the front thereof and foldable and extendible with respect to said screen; a pair of side panels hingedly connected respectively to the front of said projection chamber at either side thereof and foldable and extendible with respect to said screen; and inwardly extending wings at the upper and lower edges of each of said side panels for supporting the said upper and lower panels respectively in their extended positions, said wings entering said spaces between the upper and lower edges of the screen frame and said projection chamber when said side panels are in their folded positions.

19. A rear projection screen unit including a rigid projection chamber; a translucent screen at the front of said chamber; a screen frame mounted in the front end of said projection chamber and in which said translucent screen is mounted; at least one reflector in said chamber at the rear of said screen for reflecting on to the latter means for throwing an image on to the reflector from a position to one side of the said chamber; means for perimetrically hooding said screen at the front thereof, said hooding means comprising an upper substantially rigid panel hingedly connected to the front of the said projection chamber at the upper part thereof, a lower substantially rigid panel hingedly connected to the front of said projection chamber at the lower part thereof, and a pair of substantially rigid side panels hingedly connected one to each side of said projection chamber at the front thereof, all said panels being foldable into positions substantially parallel to and adjacent said screen and also being extensible into forwardly directed open positions so as to form a hood around said screen, and said side panels having at their upper and lower edges inwardly extending wings for supporting said upper and lower panels, respectively, in their extended positions, said wings being so arranged that, when the side panels are moved to their closed positions substantially parallel to the screen, said wings enter said projection chamber, said chamber being provided with slots adjacent the upper and lower sides of said screen frame.

20. A rear projection screen unit including a screen and a rigid projection chamber; at least one reflector in said chamber at the rear of said screen for reflecting on to the latter, means for throwing an image on to the reflector, said chamber having a projection aperture disposed at a position adjacent to one edge of said screen; a translucent screen formed of flexible material; a frame by which said screen is carried and which is arranged in the front end of said projection chamber and spaced, at least at its upper and lower edges, apart from the internal walls of such chamber so as to afford gaps; a hollow trunk having said projection aperture provided in its front end, said trunk being arranged along a side of the projection chamber and extending from adjacent the rear end of the chamber to a position somewhat short of the front end of the chamber; and perimetrical hooding means located at the front of said screen, said hooding means comprising an upper substantially rigid panel hingedly connected to the upper part of said projection chamber at the front thereof, a lower substantially rigid panel hingedly connected to the lower side of said screen frame at the front thereof, and a pair of substantially rigid side panels hingedly connected to the front end of said projection chamber, one at each side thereof, all said panels being foldable into a stowed position in which they lie substantially parallel to and adjacent said screen, and also being extensible into operative positions in which they constitute a hood around said screen, said side panels having, at their upper and lower edges, inwardly extending wings, respectively, for supporting said upper and lower panels in their extended positions and for bridging the gaps between the side panels and the ends of said upper and lower panels when the panels are extended, and said wings being so arranged that when the side panels are moved to their respective stowed positions, said wings enter said gaps left between the upper and lower sides of said screen frame and the adjacent inner surfaces of said projection chamber.

21. A rear projection screen unit comprising a rigid undivided projection chamber; a reflector arranged in said chamber adjacent the rear end thereof; a translucent screen; a frame by which said screen is carried, said frame being arranged at the front end of said projection chamber and perimetrically spaced, at least at its upper and lower sides, apart from the internal walls of said chamber, so as to afford spaces; a hollow trunk arranged along one side of said projection chamber and extending between the front and rear ends thereof and having a projection aperture at the front end thereof; and means for perimetrically hooding said screen at the front thereof, said hooding means comprising an upper rectangular panel hingedly connected to the front of said chamber at the upper part thereof, a lower rectangular panel hingedly connected to the lower part of said screen frame at the front thereof, and a pair of rectangular side panels hingedly connected to the front of said projection chamber, one at each side thereof, all said panels being stowable by folding into positions in front of and substantially parallel to said screen and extensible into forwardly extending positions where they constitute a hood around said screen, and said side panels being furnished at their upper and lower edges with inwardly extending wings for supporting the said upper and lower panels respectively in their extended positions, said wings being so arranged that, when the said side panels are moved to their stowed positions, said wings enter said projection chamber through said spaces existing between the upper and lower sides of the screen frame and the adjacent walls of the projection chamber.

JOHN LESLIE STABLEFORD.

REFERENCES CITED

The following references are of record in the file of this patent:

UNITED STATES PATENTS

| Number | Name | Date |
|---|---|---|
| 1,474,388 | Stegemann | Nov. 20, 1923 |
| 2,222,414 | Kudar | Nov. 19, 1940 |
| 2,231,395 | Schlegel | Feb. 11, 1941 |
| 2,291,931 | Troeger | Aug. 4, 1942 |
| 2,396,251 | Colley | Mar. 12, 1946 |
| 2,441,159 | Lehman et al. | May 11, 1948 |

FOREIGN PATENTS

| Number | Country | Date |
|---|---|---|
| 532,528 | France | Nov. 16, 1921 |